United States Patent
Winkler et al.

[11] Patent Number: 5,836,064
[45] Date of Patent: Nov. 17, 1998

[54] MACHINING CENTER

[75] Inventors: Hans-Henning Winkler, Tuttlingen; Karl Deufel, Kolbingen, both of Germany

[73] Assignee: Chiron-Werke GmbH & Co. KG, Tuttlingen, Germany

[21] Appl. No.: 804,308

[22] Filed: Feb. 21, 1997

[30] Foreign Application Priority Data

Mar. 1, 1996 [DE] Germany ........................ 196 07 782.6

[51] Int. Cl.$^6$ .................................................. B23Q 7/00
[52] U.S. Cl. ............................. 29/33 P; 29/564; 74/608; 409/134
[58] Field of Search .................................. 29/33 P, 564, 29/563, DIG. 56, DIG. 59; 74/608; 409/134; 483/14, 15, 10, 13

[56] References Cited

U.S. PATENT DOCUMENTS

| | | | |
|---|---|---|---|
| 3,530,571 | 9/1970 | Perry .......................................... | 29/563 |
| 3,543,392 | 12/1970 | Perry et al. ................................ | 483/13 |
| 4,185,376 | 1/1980 | Johnstone ................................... | 483/10 |
| 4,682,401 | 7/1987 | Tadashi et al. ............................. | 483/14 |
| 4,747,193 | 5/1988 | Hashidate et al. ......................... | 29/33 P |
| 4,797,989 | 1/1989 | Cherko ....................................... | 483/14 |
| 4,870,592 | 9/1989 | Lampi et al. .......................... | 29/563 X |
| 4,999,895 | 3/1991 | Hirose et al. .............................. | 29/33 P |
| 5,220,715 | 6/1993 | Otani et al. . | |

FOREIGN PATENT DOCUMENTS

| | | |
|---|---|---|
| 0 586 169 A1 | 8/1993 | European Pat. Off. . |
| 423467 | 1/1926 | Germany . |
| 39 42 600 A1 | 12/1989 | Germany . |
| 0 385 261 | 9/1990 | Germany . |
| 40 36 380 A1 | 11/1990 | Germany . |
| 42 34 674 B1 | 10/1992 | Germany . |
| 0 560 204 A1 | 9/1993 | Germany . |
| 15651 | 1/1983 | Japan ..................................... 29/33 P |
| 654237 | 2/1986 | Switzerland ............................. 483/14 |
| 212494 | 3/1924 | United Kingdom . |

*Primary Examiner*—William R. Briggs
*Attorney, Agent, or Firm*—Cummings & Lockwood

[57] ABSTRACT

A machining center comprises a plurality of machine tools arranged along a track, each of which has a working space, accessible through an operator door, for machining workpieces present in a receptacle. In addition, a loading system is provided for transporting the workpieces between the individual machine tools and for exchanging the workpieces on the machine tools through a loading opening that can be closed off by the respective operator door. At least some of the machine tools perform different machining operations in succession on the same workpiece. The loading system comprises a transport track, arranged on the machine tools for manually moving the workpieces from one machine tool to the next.

17 Claims, 4 Drawing Sheets

MACHINING CENTER

BACKGROUND OF THE INVENTION

1. Field of the Invention

The present invention relates to a machining center having a plurality of machine tools arranged along a track, each of which has a working space, accessible through an operator door, for machining workpieces present in a receptacle, as well as a loading system for transporting the workpieces between the individual machine tools and for exchanging the workpieces on the machine tools through a loading opening that can be closed off by the respective operator door, wherein at least some of the machine tools perform different machining operations in succession on the same workpiece.

2. Related Prior Art

Machining centers of this kind are commonly known.

In the known machining centers, the loading systems are automatically operated loading mechanisms that are arranged in front of the respective machine tools, which are installed next to one another either in a straight line or in a circle. The loading mechanism has a device that travels back and forth between a parts container or storage and the respective machine tool, in the process transporting workpieces. In this fashion a large number of machine tools can be supplied from a single parts container from which the workpieces to be machined are withdrawn. The individual machine tools perform different machining operations on the workpieces, so that a workpiece passes in sequence through multiple machine tools before it is deposited in another parts container.

The loading mechanism often operates at the level of the operator door, and exchanges the workpieces through the latter on the machine tool. The operator door is, however, simultaneously required for tooling and service purposes, i.e. for maintenance, for replacing tools, for gauging tools or certain geometrical factors, etc.

An example of a loading mechanism of this kind is described in DE 42 34 674 A1, in which a robot is arranged displaceably at the front of the machine tool at the height of the operator door. The robot has a mechanism by which it can displace the operator door, parallel to the machine tool, in such a way that the loading opening is uncovered. In addition, a multi-armed workpiece gripper is provided on the robot, by means of which the robot can replace workpieces on the machine tool.

If a malfunction occurs on a machine tool of this kind, or if maintenance work is required, the respective operator must enter the working space of the machine tool, past the robot and through the operator door, in order to perform the necessary work. This further means, however, that the other machine tools of a machining center equipped with such machine tools cannot continue to be serviced by the loading mechanism if priority is given to the safety of the operator.

A further disadvantage of the known machining centers lies in the complex technology for automated loading systems of this kind. These loading system are very maintenance-intensive and associated with high costs. Since the procedures are moreover no longer comprehensible to many people, there are serious objections to the everyday use of this type of "superautomation", since a majority of the usual personnel cannot operate such machining centers.

In addition to the high investment costs for loading systems of this kind, there are also additional very high costs for the highly qualified personnel required to operate such machining centers.

SUMMARY OF THE INVENTION

In view of the above, it is an object of the present invention to improve the machining center mentioned at the outset in such a way that it comprises an easy-to-operate, low-maintenance loading system of simple design that will be readily accepted by operating personnel. In addition, overall investment costs as well as operating costs are to be decreased.

According to the invention this object is achieved, in the case of the machining center mentioned at the outset by the fact that the loading system comprises a transport track, arranged on the machine tools, for manually moving the workpieces from one machine tool to the next.

The object underlying the invention is completely achieved in this manner.

Specifically, the cost- and maintenance-intensive loading systems of the related art are dispensed with, and in their place a type of manual loading system is created in which the workpieces are displaced manually from one machine tool to the other. One advantage with this system is the fact that operating personnel do not need to carry the workpieces by hand from one machine tool to the other; instead the operator proceeds, with the workpiece "machined" or "supervised" by him, from one machine to the next, where he then manually replaces the workpiece on the machine.

Despite this manual loading system which appears at first glance to be a step backward, it is readily accepted, firstly because the investment costs associated with it are very low. Acceptance is also high, however, among operating personnel, since it creates low-qualification jobs that nevertheless do not require physically strenuous activity, which is often associated with many activities for low-qualification personnel.

A further advantage is the fact that the highly qualified and therefore very expensive personnel previously required can be at least partially dispensed with, so that when weighing lower investment costs and lower costs for highly qualified personnel on the one hand, and additional costs for low-qualification personnel on the other, utilization of the new machining center is profitable in financial terms.

In addition, it is worth noting that the new machining center is more reliable due to its simpler technology and lesser requirements in terms of operation, so that the overall result is a smaller amount of down time. The aforementioned disadvantages in terms of maintenance and service on the machine tools making up the machining center are also eliminated, since the operator door is now reserved exclusively for operating personnel.

A further and quite crucial advantage with the new machining center is evident in the area of quality control, since once a machining center is set up, one or two operators can now quickly run a certain number of workpieces through it in order to test the setup and machining quality of the machining center. The complex setup of the loading system, previously required in the related art, can be dispensed with.

A further advantage consists in the fact that in this case a quality check can be performed with a few workpieces, while with the related art an entire pallet of workpieces to be loaded at the parts container always had to be worked through in order to test the overall function of the machining center. Specifically, when a loading robot sequentially processes a pallet with, for example, a hundred workpieces in one cycle, it is entirely possible for the workpieces provided at different positions in the parts container to be grasped differently by the loading robot, so that they are also clamped differently in the receptacles on the machine tools. This can lead, however, to a deviation in dimensional accuracy, etc., so that a final indication for quality control purposes is not obtained until an entire pallet of workpieces has been processed. With the new machining center, as mentioned, this can be done after working through only a few workpieces, so that the new machining center also offers great advantages in terms of quality control.

In an embodiment, it is preferred if the transport track is a roller conveyor on which transport rollers are provided transverse to the travel direction of the workpieces that can be displaced directly on it.

The advantage here is that workpiece carriages, etc. do not need to be used, so that the overall design of the transport track is greatly simplified and thus more economical. The transport rollers now make it possible for the workpieces to be placed directly on the transport track and then pushed along by the operator while he walks from one machine tool to the next. The overall physical exertion of the operators is thereby minimized, so that acceptance is very high.

It is preferred in this context if at least some of the transport rollers extend substantially horizontally, or extend substantially vertically and at a tilt away from the machine tool.

The advantage here is that depending on the geometry of the workpieces being machined, they can be transported lying down or standing up; in the latter case, the tilt of the vertical and optionally horizontal transport rollers ensures that the workpieces do not jam or fall over.

It is preferred in general if at least some of the machine tools have in their working space a buffer storage or holding container for workpieces.

The advantage here is that operating personnel can first place the machined workpieces in the holding container, and then take the next workpiece from the transport rollers and lay it on the receptacle before then taking the workpiece back out of the holding container and setting it on the transport rollers. This makes possible a simple handling sequence, with the operator always knowing where he can set the workpiece down.

On the other hand it is further preferred if at least some of the machine tools have in their working space an ejector that automatically transfers machined workpieces out of the receptacle into the holding container.

The advantage here is that operating personnel have one less manual action to perform, since the workpieces are taken out of the receptacle and placed into the holding container automatically. Ejectors of this kind are technically very simple to implement, so that they are not associated with high investment costs. Simple ejectors of this kind cannot, however, be used with automatic loading systems, since when such ejectors are used the position of the workpieces in the holding container is not precisely defined. A loading robot would thus have difficulty removing from a holding container a workpiece ejected in this fashion. Such difficulties of course do not occur with operating personnel.

In a development, it is preferred if at least some of the machine tools have an automatic opening mechanism which automatically opens the operator door after the particular machining operation on a workpiece is complete.

This feature is advantageous in terms of safety, since the operator does not actually enter the working space until the operator door has been automatically opened, which however does not occur until the particular machining operation is complete. An opening mechanism of this kind involves little technical complexity, since the sequence controller of the machine tool, which determines when machining itself is complete, must then simply supply an opening pulse to, for example, a motor or hydraulic drive. But minimal demands are also then made in terms of the attentiveness of the operator: there is no need to decide when the operator door can in fact be opened.

It is further preferred in this instance if at least some of the machine tools have an automatic rinsing mechanism which, once machining of a particular workpiece is complete, automatically rinses the latter and the receptacle.

The advantage here is that the workpieces removed by operating personnel from the working space have had chips and drilling fluid cleaned off them, so that work on the new machining center is not associated with a great deal of dirt. This again results in high acceptance of the new machining center, especially in those companies in which highly automated machines have not hitherto been used. When such a company now converts at least a portion of its production to the new machining center, the existing personnel can continue to be utilized; their working environment improves greatly due to the low physical demands and the reduced amount of dirt.

It is further preferred if at least some of the machine tools have a detection apparatus which, after the workpiece has been exchanged, automatically closes the operator door and starts the machining operation for the next workpiece.

This feature first of all offers safety advantages, since the next machining step is initiated based on the working speed of the particular operator, the operator door being previously closed. On the other hand, operating personnel are relieved of the task of actuating specific knobs or levers in order to initiate the next working step, so that not only are incorrect operations eliminated, but also less-qualified personnel can be utilized.

The detection apparatus can have, in this context, a photoelectric barrier which monitors the loading opening, or can comprise a switch that is preferably automatically triggered by an operator when the latter leaves the vicinity of the loading opening after the workpiece exchange.

These features are advantageous in terms of design because both the photoelectric barrier and the switch are simple components from which a detection apparatus of this kind can be constructed economically. The switch can be, for example, a proximity switch or a so-called "walk switch," which has a stick projecting into the area where the operator walks.

It is preferable overall if a system of collection sumps, which by means of collector panels return fluid dripping from the workpieces back into the machine tool, is provided beneath the transport track.

The advantage here is that the area where operating personnel walk is not contaminated with dripping rinse water, so that the overall acceptance of the new machining center is again improved. A further advantage is the fact that the shop area where the new machining center is installed is relatively easy to clean. The operating costs of the new machining center are also decreased by this feature, since the returned fluid can optionally be reused after suitable filtration.

In a development, it is preferred if the transport track has stationary sections which in each case connect two adjacent machine tools to one another, as well as displaceable sections that are arranged, transversely displaceably, in front of an operator door in such a way that they can be slid through the loading opening into the working space.

This feature is advantageous in particular for protruding machine tools such that the operator must lean far into the working space in order to insert the workpiece into the receptacle.

The displaceable section is preferably a loading carriage that can be displaced by means of a slide.

It is of further advantage here that a smoothly-running slide is used, as is utilized, for example, on machine tables, so that the operator can slide this loading carriage effortlessly into the working space, where only the exchange of workpieces needs to be performed manually. The effort required for this is therefore minimal.

If the loading carriage can be locked onto the slide by means of a quick-release fastener, it can easily be replaced for service purposes so that handling is advantageously simplified.

It is further preferred in this context if the displaceable section is held nondisplaceably in its rest position outside the working space by means of a snap lock, the detection apparatus preferably comprising a limit switch that responds to the relative position of the displaceable section with respect to the operator door.

This feature is advantageous in design terms because the snap lock allows the loading carriage to be easily locked in its rest position. On the other hand, the snap lock can be overridden by gentle pressure, so that the loading carriage can easily be slid into the working space. The arrangement of the limit switch offers further design advantages, since the workpiece change operation is definitely complete when the loading carriage returns to its rest position; this is reported by the limit switch to the sequence controller, which then closes the operator door and starts the next machining step.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

An exemplified embodiment of the invention is shown in the attached drawings and will be described in more detail in the description below. In the drawings.

DESCRIPTION OF A PREFERRED EMBODIMENT

Figure 1:
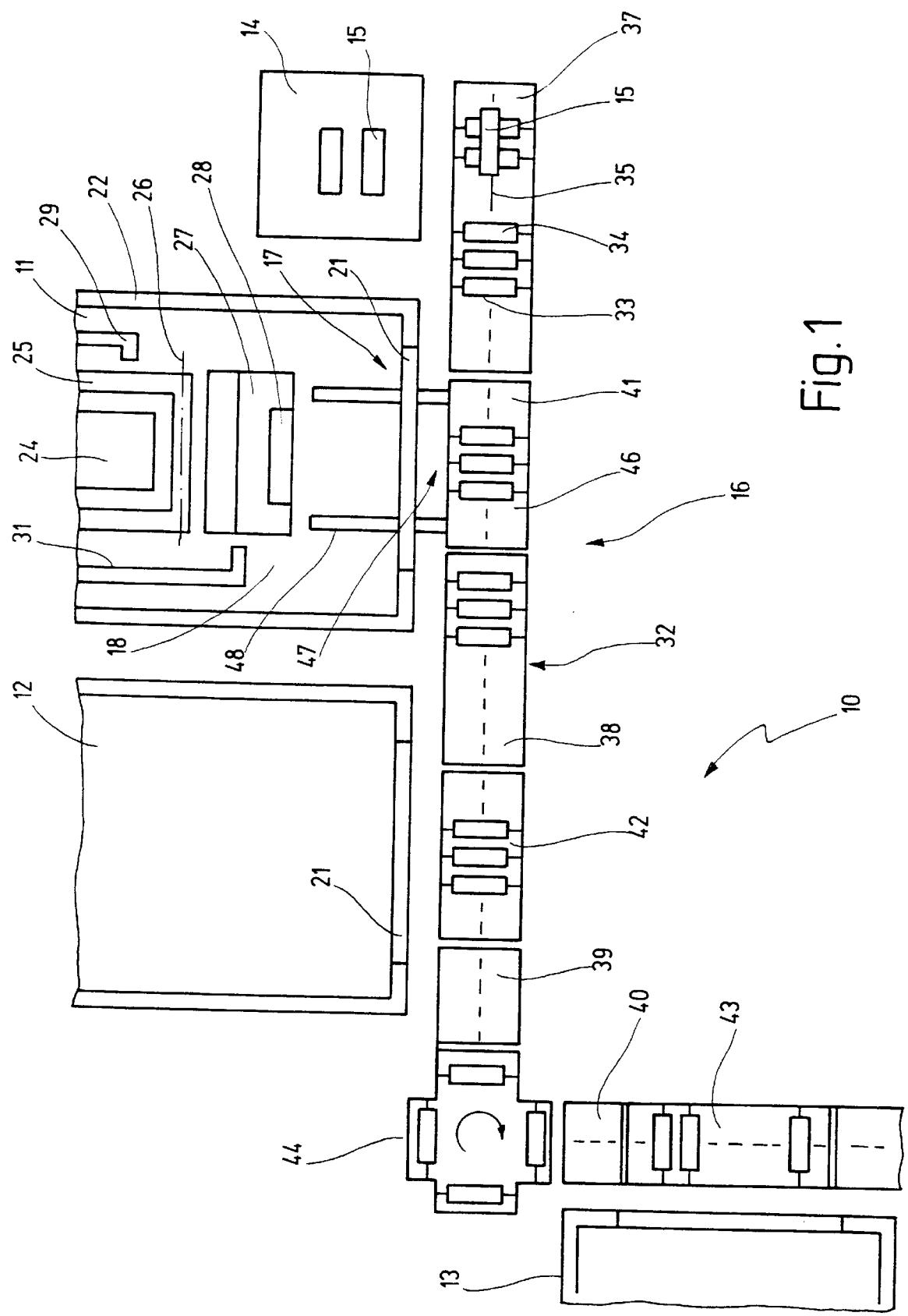
FIG. 1 shows a schematic plan view of the new machining center.

FIG. 1 schematically shows a top view of a new machining center 10 in which machine tools 11, 12, and 13 are arranged along a U-shaped track. Also indicated to the right of machine tool 11 in FIG. 1 is a parts container 14 which carries workpieces 15 to be machined.

Machining center 10 further has a loading system 16 which is provided in order to transport workpieces 15 to and between the individual machine tools 11, 12, 13, and to allow exchanging of workpieces 15 at machine tools 11, 12, 13.

Loading system 16 is a loading system for manual operation, as will be described in further detail below.

Workpieces 15, transported manually to, for example, machine tool 11, are manually introduced through a loading opening 17 into a working space 18 of the machine tool. To this end, an operator door 21, which closes off loading opening 17 and is arranged in a cover panel 22 of machine tool 11, is opened.

A receptacle 24 for workpieces 15 to be machined is provided in working space 18. Arranged on receptacle 24 is an ejector 25 which can pivot upward about a pivot axis 26 and thereby transfers machined workpieces 15 from receptacle 24 into a holding container 27. It is evident from FIG. 1 that a machined workpiece 28 is present in holding container 27.

Provided on either side of receptacle 24, ejector 25, and holding container 27 are rinsing pipes 29 and 31 which, after ejection of a machined workpiece 28, rinse both receptacle 24 and workpiece 28 in receptacle 27, thereby removing chips and drilling fluid.

For manual transport of workpieces 15, 28 between machine tools 11, 12, 13, loading system 16 comprises a transport track 32 which is a roller conveyor 33 with horizontal transport rollers 34. On these transport rollers 34, workpieces 15 can be displaced by operating personnel in a travel direction indicated by an arrow 35, for which only a very small exertion is required. Regardless of the weight and bulk of workpieces 15, workpieces of any kind can be pushed on this transport track 32, even by persons of no great strength, to the individual machine tools 11, 12, 13.

Transport track 32 has stationary sections 37, 38, 39, 40 which connect machine tools 11, 12, 13 to one another and connect machine tool 11 to parts container 14.

Provided between these stationary sections 37, 38, 39, 40 are displaceable sections 41, 42, 43, which are each arranged in the region of an operator door 21 and have a lesser width than the latter.

Additionally provided between stationary sections 39 and 40 is a rotatable corner piece 44 into which workpieces 15, 28 are introduced from, for example, the right, whereupon said corner piece 44 then rotates 90 degrees so that workpiece 15, 28 can then be pushed onto section 40.

Displaceable sections 41, 42, 43 are configured as loading carriages 46 which sit on a slide 47. Each such slide 47 comprises two guide rails 48 which lead through operator door 21 into working space 18.

When operator door 21 is open, an operator who has pushed a workpiece 15, 28 onto loading carriage 46 can push the latter into working space 18, where workpiece 15 is then first placed onto receptacle 24 before the machined workpiece 28 is then removed from holding container 27 and placed on loading carriage 46. Loading carriage 46 is pulled out of working space 18, whereupon machine tool 11 begins machining the next workpiece 15.

Figure 2:
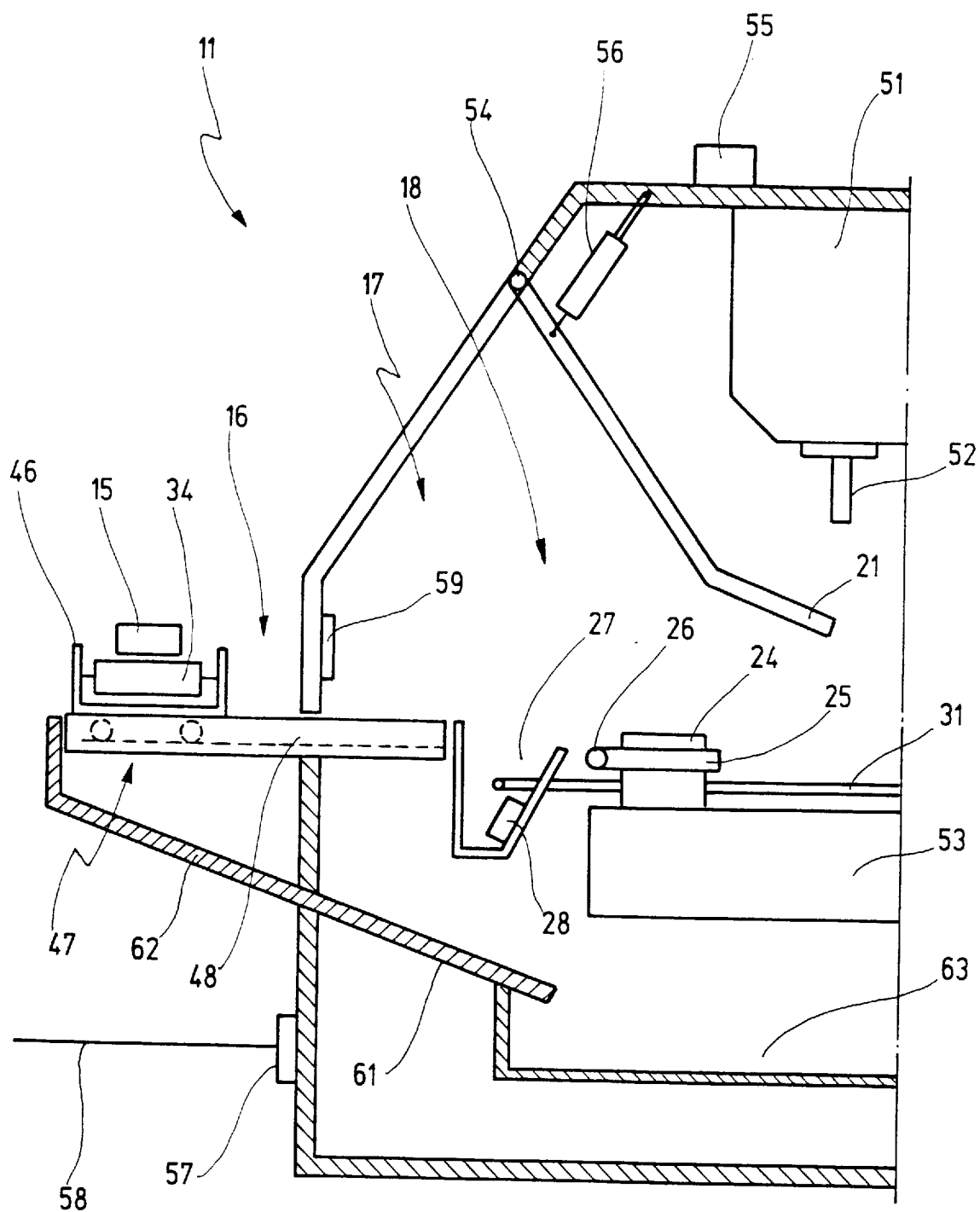
FIG. 2 shows a schematic side view of a machine tool from the machining center of FIG. 1.

FIG. 2 shows machine tool 11 in a side view as seen from the right in FIG. 1.

FIG. 2 first indicates a spindle 51 of machine tool 11, which carries a tool 52 for machining a workpiece 15. Also shown is a workpiece table 53, on which receptacle 24 is arranged. Ejector 25 is located beneath and alongside receptacle 24, so that when pivoted about its pivot axis 26, it transfers a machined workpiece 28 into holding container 27.

FIG. 2 schematically shows operator door 21 swung inward about its pivot axis 54, so that an operator can now slide loading carriage 46 into working space 18 in order then, through loading opening 17, to place workpiece 15 on receptacle 24 and remove machined workpiece 28. A displaceable loading carriage 46 is required, to facilitate the work, only on those machine tools 11, 12, 13 of machining center 10 where spindle head 15, or the tool changer arranged thereon, has such a large working radius that the operator must lean far into working space 18 in order to gain access to receptacle 24. In the case of machine tools with less depth, loading carriage 46, slide 47, and guide rails 48 can of course be omitted.

In FIG. 2 there is also provided schematically on machine tool 11 a sequence controller 55 which controls receptacle 24, ejector 25, rinsing pipes 29, 31, and operator door 21. After machining of workpiece 28 is complete, sequence controller 55 ensures that workpiece 28 is automatically ejected into holding container 27 where it is rinsed. Operator door 21 can then be pivoted into its open position by means of a schematically indicated piston-cylinder unit 56.

Exchanging of workpieces 14, 28 is now monitored by the fact that, for example, a switch 57 with a springable or resilient rod 58 is provided, projecting into the area where an operator walks. When an operator has performed the workpiece exchange and has moved away from machine tool 11 with workpiece 28 on roller conveyor 33, he thereby pushes against rod 58; this is reported by switch 57 to sequence controller 55, which thereupon closes operator door 21 and begins machining the next workpiece 15.

Alternatively, a photoelectric barrier 59, which monitors the removal of workpiece 28 and reports it to sequence controller 55, can also be provided. This automatic opening mechanism 55, 56 and automatic detection apparatus 57, 59 ensure that the operator does not need to perform further manipulations at machine tool 11, so that high operating reliability is guaranteed despite the simple design.

Also provided beneath loading system 16 is a system of collection sumps 61 with collector panels 62, by means of which water dripping from workpieces 15, 28 onto transport track 32 runs into a collector 63 in machine tool 11, where it is collected and can be reused.

Figure 3:
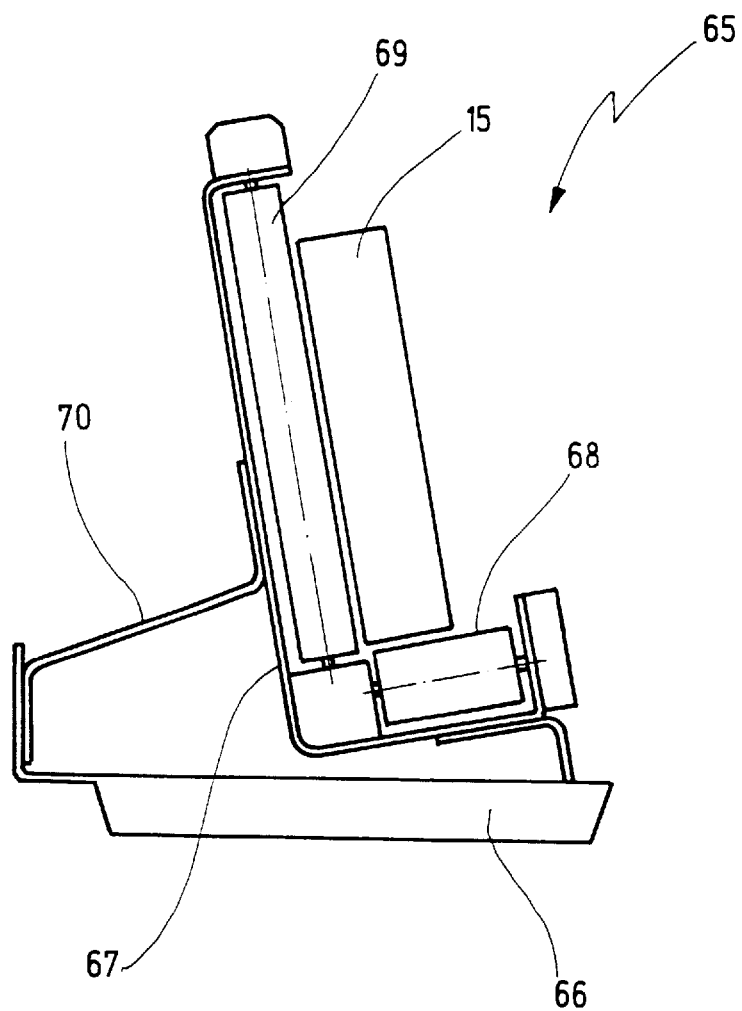
FIG. 3 shows a schematic side view of a loading carriage to be used with the machining center of FIG. 1.

FIG. 3 shows a further embodiment of a loading carriage 65 such as can be used in the case of transport track 32 of FIGS. 1 and 2.

Loading carriage 65 first of all comprises a bottom panel 66 by means of which it is set onto slide 47. Also provided is a bent, L-shaped panel 67 that rests obliquely on bottom panel 66.

Horizontal transport rollers 68 and vertical transport rollers 69, on which a schematically indicated workpiece 15 is displaceable, are provided on bent panel 67. Transport rollers 68, 69 are tilted to the left in FIG. 3, i.e. away from the machine tool, to ensure a secure position for workpiece 15. For strength, a support panel 70 which joins bent panel 67 to bottom panel 66 is also provided.

Figure 4:
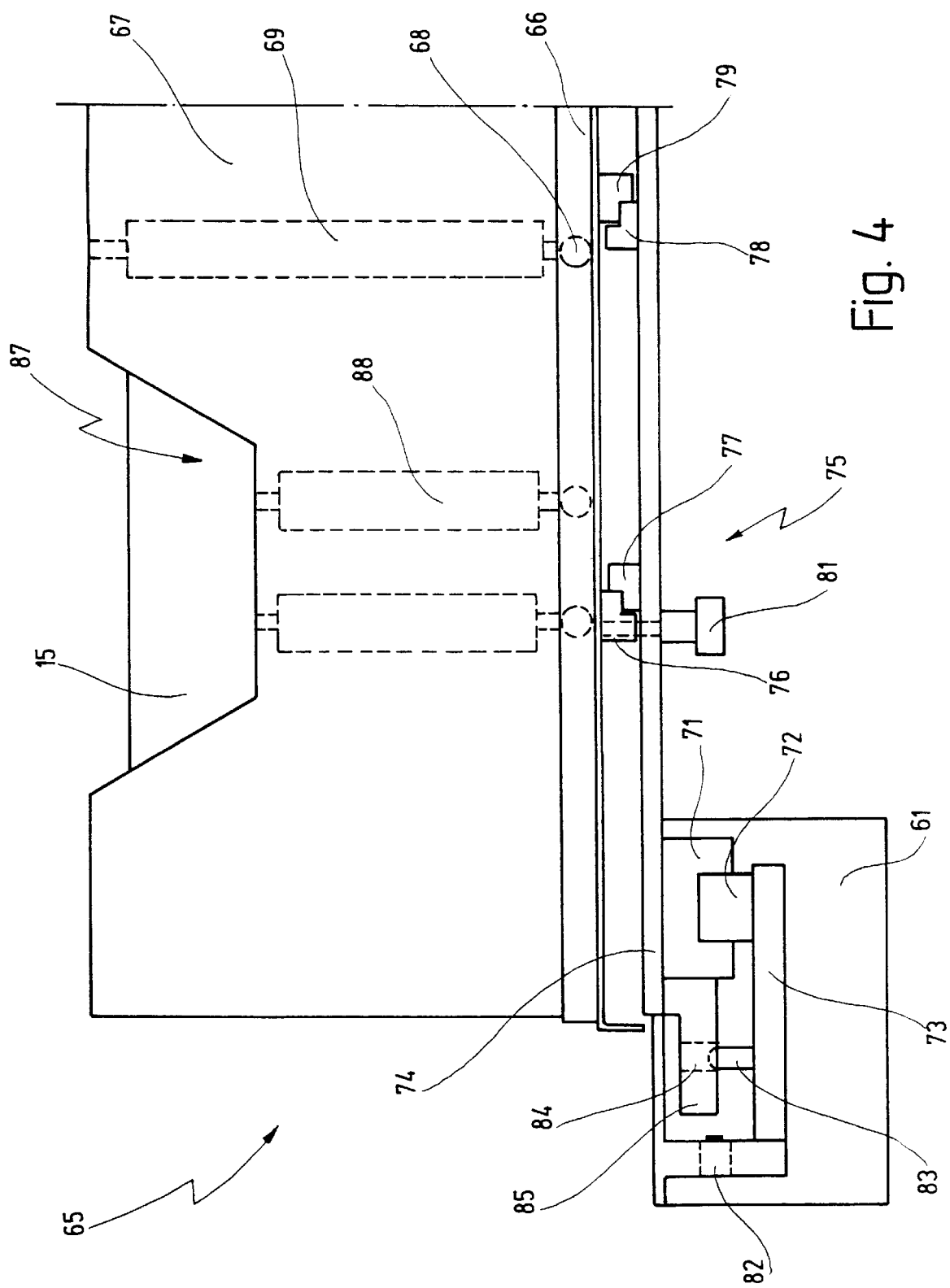
FIG. 4 shows a schematic front view of the loading carriage of FIG. 3.

FIG. 4 shows a plan view, viewed from the left, of loading carriage 65 of FIG. 3. The depiction in FIG. 4 is selected in sections, portions of slide 47 also being shown.

Slide 47 comprises first of all a linear guide 71 that runs on a guide rail 72 which corresponds to guide rails 48 of FIG. 1. Guide rail 72 is mounted via a support 73 on machine tool 11. Arranged on linear guide 71 is a continuous plate 74 that (although not shown in FIG. 4) sits on the right-hand side on a further linear guide 71 which runs on a further guide rail 72.

Loading carriage 65 sits on continuous plate 74 with its bottom panel 66, a quick-release fastener 75 being arranged between bottom panel 66 and plate 74. This quick-release fastener 75 operates in the manner of a bayonet fastener, but is configured slidably rather than rotatably.

For this purpose, quick-release fastener 75 comprises two L-shaped profiled rails 76, 77 that come into engagement with one another by displacement of loading carriage 65 with respect to plate 74.

Provided to the right of profiled rails 76 and 77 are two further profiled rails 78 and 79, profiled rails 76 and 79 being mounted on bottom panel 66 while profiled rails 77 and 78 are mounted on plate 74. The result of this arrangement is that loading carriage cannot be displaced perpendicular to plate 74.

Also indicated is a spring-loaded snap bolt 81 which implements a snap lock, releasable only manually, between loading carriage 65 and slide 47.

Although loading carriage 65 fits in mechanically very secure fashion on plate 74, loading carriage 65 can easily be removed by simply pulling snap bolt 81 downward, whereupon loading carriage 65 is displaced perpendicular to the drawing plane of FIG. 4 with respect to plate 74, so that the quick-release fastener 65 becomes disengaged.

FIG. 4 further shows that a limit switch 82, by means of which the position of plate 74 and therefore of loading carriage 65 with respect to support 73 can be determined, is provided on support 63. The information from this limit switch 82 can be used, as a supplement or alternative to the information from switch 57 and/or photoelectric barrier 59, to generate a control signal to close operator door 21 and to start the next machining operation.

Also provided on support 73 is a snap lug 83 which engages into a corresponding snap hole 84 that is provided on an extension arm 85 of plate 74. By means of this snap lock 83, 84, plate 74 is locked in its rest position in which loading carriage 65 is retracted entirely out of working space 18, i.e. is in the position all the way to the left in FIG. 2. Snap lock 83, 84 is easy to override, so that loading carriage 65 can be slid into working space 18 with little exertion, but can nevertheless be securely locked in the rest position.

Lastly, it is evident from FIG. 4 that the loading carriage has in bent panel 67 a cutout 87 which makes workpiece 15 easy to grasp. Short transport rollers 88 are provided in the region of cutout 87, while the larger vertical transport rollers 69 shown in FIG. 3 are located on either side of cutout 87.

We claim:

1. A machining center comprising: a plurality of machine tools arranged along a track, each machine tool having a working space and a receptacle arranged within said working space for receiving workpieces to be machined, said working space being accessible through a loading opening for exchanging workpieces and closed off by an operator door, and a loading system for transporting said workpieces between individual ones of said machine tools, said loading system comprising a transport track, arranged on the machine tools, for manually moving the workpieces from one machine tool to the next, wherein at least some of the machine tools perform different machining operations in succession on the same workpiece, and wherein the transport track has stationary sections which in each case connect two adjacent machine tool to one another, as well as displaceable sections that are arranged, transversely displaceably, in front of an operator door in such a way that they can be slid through the loading opening into the workspace.

2. The machining center of claim 1, wherein the transport track is a roller conveyor on which transport rollers are provided transverse to the travel direction of the workpieces that can be displaced directly on it.

3. The machining center of claim 2, wherein at least some of the transport rollers extend substantially horizontally.

4. The machining center of claim 2, wherein at least some of the transport rollers extend substantially vertically and at a tilt away from the machine tool.

5. The machining center of claim 1, wherein at least some of the machine tools have in their working space a holding container for workpieces.

6. The machining center of claim 5, wherein at least some of the machine tools have in their working space an ejector that automatically transfers machined workpieces out of the receptacle into a holding container.

7. The machining center of claim 1, wherein at least some of the machine tools have an automatic opening mechanism which automatically opens the operator door after the particular machining operation on a workpiece is complete.

8. The machining center of claim 1, wherein at least some of the machine tools have an automatic rinsing mechanism which, once machining of a particular workpiece is complete, automatically rinses the latter and the receptacle.

9. The machining center of claim 1, wherein at least some of the machine tools have a detection apparatus which, after the workpiece has been exchanged, automatically closes the operator door and starts the machining operation for the next workpiece.

10. The machining center of claim 9, wherein the detection apparatus comprises a photoelectric barrier which monitors the loading opening.

11. The machining center of claim 9, wherein the detection apparatus comprises a switch that is automatically triggered by an operator when the latter leaves the vicinity of the loading opening after the workpiece exchange.

12. The machining center of claim 1, wherein a system of collection sumps, which by means of collector panels return fluid dripping from the workpieces back into the machine tool, is provided beneath the transport track.

13. A machining center comprising: a plurality of machine tools arranged along a track, each machine tool having a working space and a receptacle arranged within said working space for receiving workpieces to be machined, said working space being accessible through a loading opening for exchanging workpieces and closed off by an operator door, and a loading system for transporting said workpieces between individual ones of said machine tools, said loading system comprising a transport track, arranged on the machine tools, for manually moving the workpieces from one machine tool to the next, wherein at least some of the machine tools perform different machining operations in succession on the same workpiece, at least some of the machine tools have a detection apparatus which, after the workpiece has been exchanged, automatically closes the operator door and starts the machining operation for the next workpiece, wherein the transport track has stationary sections which in each case connect two adjacent machine tools to one another, as well as displaceable sections that are arranged, transversely displaceably, in front of an operator door in such a way that they can be slid through the loading opening into the working space.

14. The machining center of claim 1, wherein the displaceable section is configured as a loading carriage that can be displaced by means of a slide.

15. The machining center of claim 14, wherein the loading carriage can be locked onto the slide by means of a quick-release fastener.

16. The machining center of claim 1, wherein the displaceable section is held nondisplaceably in its rest position outside the working space by means of a snap lock.

17. The machining center of claim 13, wherein the detection apparatus comprises a limit switch that responds to the relative position of the displaceable section with respect to the operator door.

* * * * *